(12) United States Patent
Brady

(10) Patent No.: US 7,032,505 B2
(45) Date of Patent: Apr. 25, 2006

(54) FRENCH PRESS COFFEE MAKER WITH SECONDARY FILTER

(75) Inventor: Frank A. Brady, Danville, CA (US)

(73) Assignee: Meyer Intellectual Property Ltd., (GB)

(*) Notice: Subject to any disclaimer, the term of this patent is extended or adjusted under 35 U.S.C. 154(b) by 607 days.

(21) Appl. No.: 10/113,704

(22) Filed: Mar. 27, 2002

(65) Prior Publication Data
US 2003/0185949 A1 Oct. 2, 2003

(51) Int. Cl.
A47J 31/06 (2006.01)

(52) U.S. Cl. .......................... 99/297; 99/287

(58) Field of Classification Search ............... 426/433; 99/297, 287
See application file for complete search history.

(56) References Cited

U.S. PATENT DOCUMENTS

| | | | | |
|---|---|---|---|---|
| 27,959 A | * | 4/1860 | Alexander, Jr. et al. | 83/597 |
| 2,286,990 A | * | 6/1942 | Lehmann | 99/292 |
| 2,589,783 A | * | 3/1952 | Crossley et al. | 99/295 |
| 4,948,499 A | * | 8/1990 | Peranio | 210/180 |
| 5,570,624 A | * | 11/1996 | Chang | 99/285 |
| 6,079,316 A | | 6/2000 | Barden et al. | 99/297 |
| 6,422,133 B1 | * | 7/2002 | Brady | 99/297 |
| 6,725,763 B1 | * | 4/2004 | Cai | 99/287 |

OTHER PUBLICATIONS

Krups 859-70 AquaControl 10-Cup Cordless Electric Kettle <<http://www.amazon.com/exec/obidos/tg/stores/detail/—kitchen/B00005AM8S/qid=1020101937/sr=8-1/ref=sr_8$_{13}$ 71 _/002-11005198-9418400>> visited on Apr. 29, 2002. (6 pages total).

Krups 859-70 AquaControl 10-Cup Cordless Electric Kettle <<http://www.amazon.com/exec/obidos/tg/stores/detail/—/kitchen/B00005AM8S/pictures/14/002-8606619-8616845>> visited on Apr. 29, 2002. (4 pages total).

* cited by examiner

Primary Examiner—Anthony Weier

(57) ABSTRACT

A steeping apparatus is for steeping a solid food material in a liquid to impart a flavor of the solid food material to the liquid to produce a flavored beverage. A container is provided to hold the solid food material and the liquid. The container forms an opening, through which the solid food material and the liquid are inserted into the container, and a spout at a peripheral of the opening, through which the flavored beverage is poured out of the container. A plunger is movable with respect to the container between a first plunger position and a second plunger position. A plunger moving element coupled to the plunger such that the plunger moves from the first plunger position to the second plunger position as the plunger moving element is moved. The plunger includes a filter element that, as the plunger moves from the first plunger position to the second plunger position, permits the flow of liquid therethrough but that substantially inhibits the passage of solid food material therethrough. A lid is coupled to the opening of the container. The lid further includes a secondary filter element located over the spout of the container.

7 Claims, 4 Drawing Sheets

FRENCH PRESS COFFEE MAKER WITH SECONDARY FILTER

TECHNICAL FIELD

The present application is in the field of French press coffee makers and, more particularly, is directed to a French press coffee maker with a lid that has a secondary filter to filter out grounds not filtered by the primary filter of the plunger.

BACKGROUND

It is well known to use French press coffee makers to "steep" coffee. Namely, boiling water is mixed with coarsely ground coffee in a container. After the coffee is allowed to steep for several minutes, one presses down on a handle, thus containing the grounds in the bottom of the container beneath a perforated disk. The perforations allow the coffee to pass through the disk as the disk is pushed through the liquid to the bottom of the container. The coffee can then be poured (or drunk directly) from the container while the grounds are prevented from flowing out of the container.

A disadvantage with French press coffee makers is that the disk does not always retain the grounds at the bottom of the container. Unlike paper filters used in drip makers, the filter of the disk (typically a screen) of a French press coffee maker has openings large enough to allow liquid to pass through it freely. Unfortunately, these large openings also sometimes allow grounds to pass through, too. When this happens, it is likely that the grounds will end up in the user's cup.

SUMMARY

A steeping apparatus is for steeping a solid food material in a liquid to impart a flavor of the solid food material to the liquid to produce a flavored beverage. A container is provided to hold the solid food material and the liquid. The container forms an opening, through which the solid food material and the liquid are inserted into the container, and a spout at a peripheral of the opening, through which the flavored beverage is poured out of the container.

A plunger is movable with respect to the container between a first plunger position and a second plunger position. A plunger moving element coupled to the plunger such that the plunger moves from the first plunger position to the second plunger position as the plunger moving element is moved.

The plunger includes a filter element that, as the plunger moves from the first plunger position to the second plunger position, permits the flow of liquid therethrough but that substantially inhibits the passage of solid food material therethrough. A lid is coupled to the opening of the container. The lid further includes a secondary filter element located over the spout of the container.

DETAILED DESCRIPTION

Figure 1:
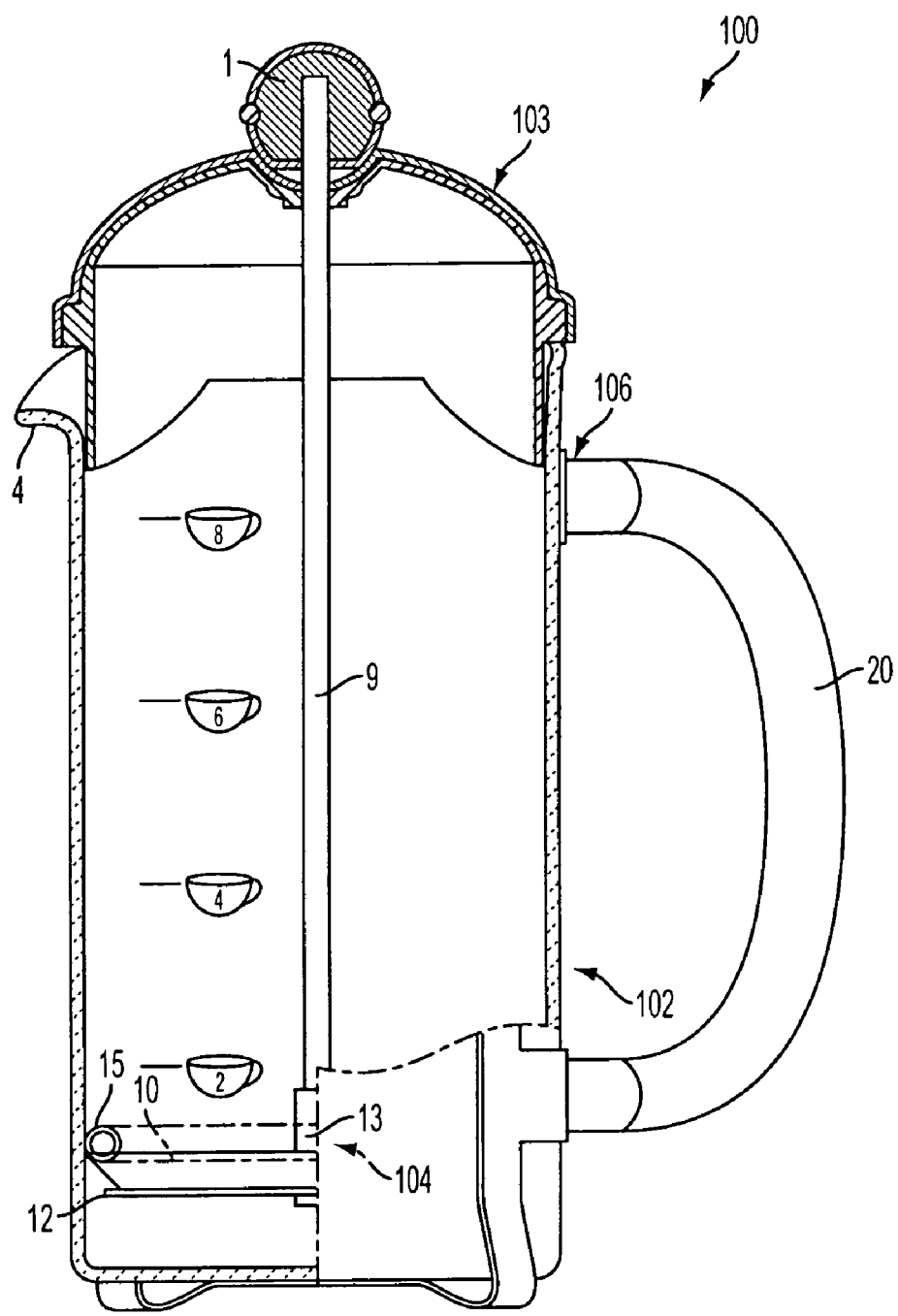
FIG. 1 illustrates a French press type coffee maker in accordance with an embodiment of the invention.

FIG. 1 illustrates—in partial breakaway—a French press coffee maker 100 in accordance with an embodiment of the invention. The French press coffee maker 100 includes a thermal carafe (insulated) container 102. In other embodiments, the container is made of other materials, insulated or otherwise, such as glass, non-insulated stainless steel, or plastic. Attached to the container 102 is a handle 20, and the container also includes a spout 4. The coffee maker 100 further includes a removable lid 103 that, when removed from the container 102, exposes an opening 106 at the top of the container 102 and otherwise covers the opening 106.

The coffee maker 100 also includes a plunger assembly 104, including a screen 10 held in place over a perforated "spring disk" 12 by a spring 15. The plunger assembly 104 is illustrated in greater detail in the remaining figures. The plunger assembly 104 is attached to a shaft 9 that protrudes through the lid 103. The upper end of the shaft 9 terminates at a knob 1. The shaft 9 is shown in FIG. 1 as a cylindrical rod, but the shaft is not limited to having any particular shape.

In use, a user removes the lid 103, along with the plunger assembly 104, and pours into the container 102 coffee grounds and hot water (at or near the boiling point temperature). The user then replaces the lid 103 but leaves the shaft 9 in a raised position so that the plunger assembly 104 is near or above the top surface of the water in the container 102. This allows the water to freely interact with the coffee grounds. After a steeping period, the user then uses the knob 1 to lower the shaft 9 such that the grounds are nominally trapped beneath the plunger assembly 104, and the resulting coffee can be poured from the container 102 via the spout 4.

Figure 2A:
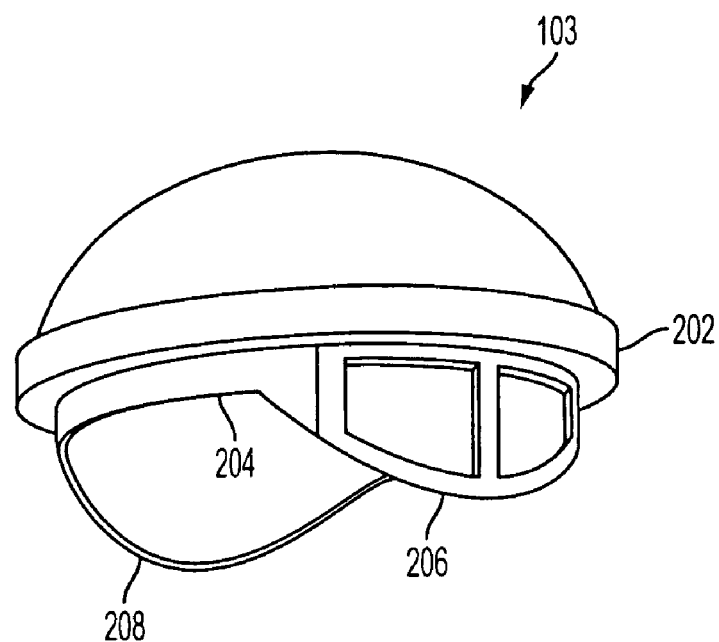
FIGS. 2A and 2B illustrate a lid of the FIG. 1 coffee maker in accordance with an embodiment of the invention.
Figure 2B:
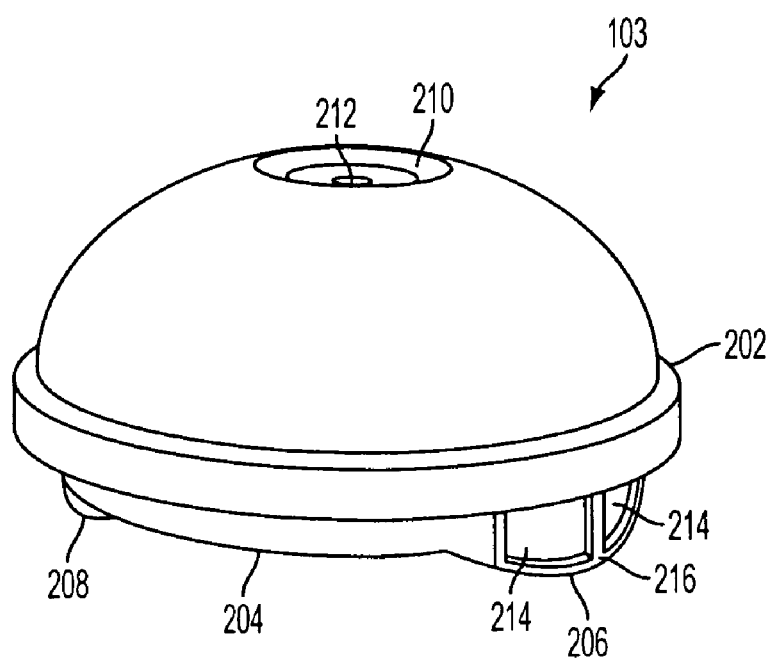

As discussed in the Background, however, a portion of the grounds escape through the screen 10 of the plunger assembly 104 into the coffee to be poured from the container 102 via the spout 4. Referring now to FIGS. 2A and 2B, an embodiment of the lid 103 is described that includes a secondary filter 206 to prevent such escaped grounds from leaving the container 102 as the coffee is poured via the spout 4. While the lid 103 is installed onto the container 102, a rim 202 of the lid rests on the top opening of the container 102. An underportion 204 of the lid 103 includes a stabilizer tab 208 and the secondary filter 206 opposite the stabilizer tab 208. At its top, the lid 103 forms a socket 210 into which the knob 1 (FIG. 1) of the coffee maker 100 rests when the plunger assembly 104 is at its lowered position. The shaft 9 (FIG. 1) protrudes through a hole 212 formed in the lid 103 and is terminated with the knob 1.

The secondary filter 206 includes a frame 216 forming two openings 214, and a screen across the two openings 214. The secondary filter 206 sits within the spout 4 and filters out grounds not trapped beneath the plunger assembly 104 in normal operation of the plunger assembly 104. The stabilizing tab 208 helps to hold the lid 103 in place. The stabilizing tab 208 may also function as a splash guard. That is, the user may turn the lid 103 so that the stabilizing tab 208 covers the spout 4, to prevent liquid from splashing out of the container while lowering the shaft 9 or when carrying the coffee maker 100 when it is full. To dispense the liquid from the coffee maker 100, the lid 103 is turned so that the spout 4 is uncovered and liquid can be dispensed.

In accordance with one embodiment, the lid 103 is formed of a portion 302 that is similar to a lid of a conventional coffee maker and of a portion 201 like the lid illustrated in FIGS. 2A and 2B. The portion 201 mates to the portion 302 to form the lid 103. That is, the rim 202 mates to a similar rim 304; the socket 210 mates to a similar socket 308; and a hole 212 mates to a similar hole 310. As with the embodiment of FIGS. 2A and 2B, the secondary filter 206 sits within the spout 4 and filters out grounds not trapped beneath the plunger assembly 104 in normal operation of the plunger assembly 104. Similarly, the stabilizing tab 208 helps to hold the lid 103 in place and is useable as a splash guard.

In accordance with another embodiment, the portion 201, while including a secondary filter 206, is otherwise minimally configured to be attachable to the portion 302 to form the lid 103 having secondary filtering capabilities.

Figure 3:
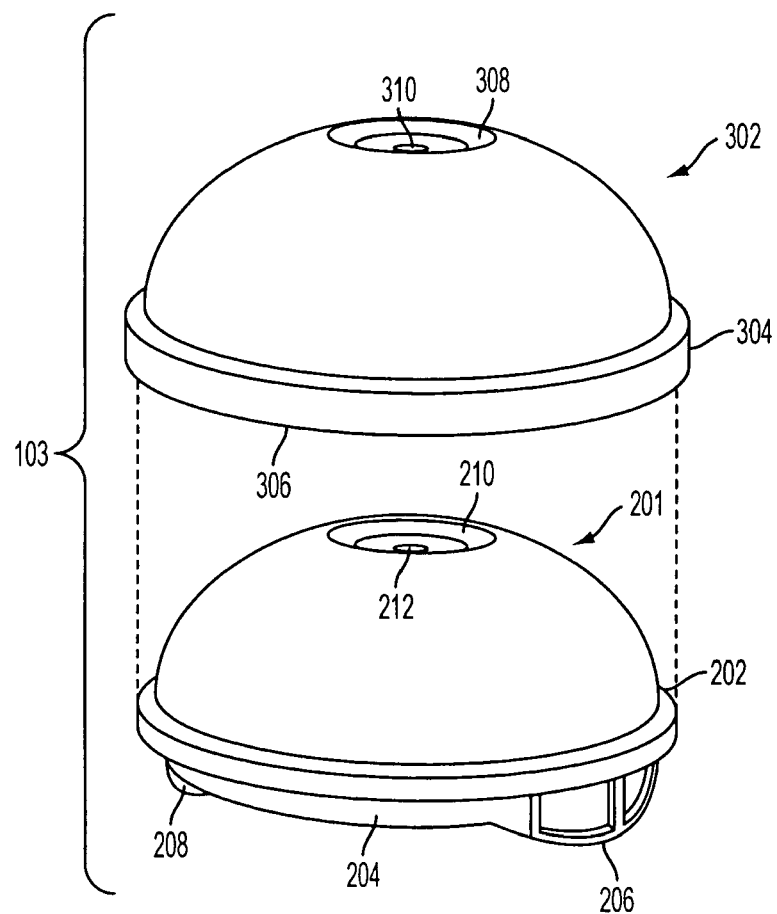
FIG. 3 illustrates, in exploded view, a lid of the FIG. 1 coffee maker in accordance with a further embodiment of the invention.
Figure 4:
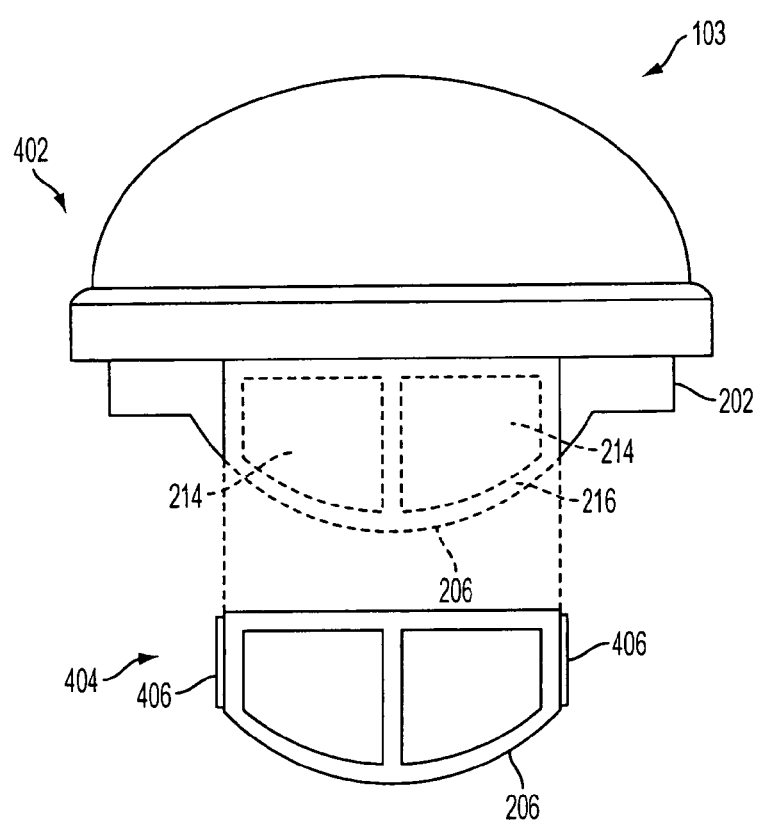
FIG. 4 illustrates, in exploded view, the lid of FIGS. 2A and 2B.

FIG. 4 illustrates how, in accordance with one embodiment, the lid 103 of FIGS. 2A and 2B (alternately, the portion 102 of FIG. 3—referred to herein by reference numeral 103 for ease of reference) is constructed. In particular, the lid 103 is formed in two parts, a main part 402 and the secondary filter part 404. For example, the main part 402 may be formed of molded plastic. The secondary filter part 404 is formed of plastic molded over a screen such that the screen covers the two openings 214 in the secondary filter part 404. Furthermore, two notches 406 in the secondary filter part 404 match corresponding grooves (not shown) in the main part 402, and the secondary filter part 404 is snap-fitted into the main part 402. Thus in accordance with the embodiment described with reference to FIG. 4, the lid 103 is easily assembled. In accordance with another embodiment, the grooves are in the secondary filter part 404 and the notches are in the main part 402.

In accordance with yet other embodiments, the lid is a single molded piece. That is, the main part 402 and the secondary filter part 404 are formed of a single mold.

It can be seen, then, that the secondary filter minimizes (or eliminates) grounds from leaving the container of a French press coffee maker.

What is claimed is:

1. A steeping apparatus for steeping a solid food material in a liquid to impart a flavor of the solid food material to the liquid to produce a flavored beverage, comprising:
    a container to hold the solid food material and the liquid, the container forming an opening, through which the solid food material and the liquid are inserted into the container, and a spout at a peripheral of the opening, through which the flavored beverage is poured out of the container;
    a plunger movable with respect to the container between a first plunger position and a second plunger position, the plunger including a filter element that, as the plunger moves from the first plunger position to the second plunger position, permits the flow of liquid therethrough but that substantially inhibits the passage of solid food material therethrough;
    a lid coupled to the opening of the container, the lid further including a secondary filter element locatable over the spout of the container; and
    a plunger moving element coupled to the plunger such that the plunger moves from the first plunger position to the second plunger position as the plunger moving element is moved.

2. The steeping apparatus of claim 1, wherein:
the lid forms a hole; and
the plunger moving element extends through the hole formed in the lid and terminates in a knob.

3. The steeping apparatus of claim 1, wherein:
the secondary filter element includes a frame forming at least one aperture therein, and a screen covering the aperture and through which the flavored beverage being poured out of the container passes.

4. The steeping apparatus of claim 3, wherein:
the frame includes at least one notch formed therein,
the lid includes a corresponding at least one groove; and
the at least one notch is matched to the at least one groove.

5. The steeping apparatus of claim 3, wherein:
the frame includes at least one groove formed therein,
the lid includes a corresponding at least one notch; and
the at least one notch is matched to the at least one groove.

6. The steeping apparatus of claim 3, wherein the lid includes a tab that extends from the lid into the container along an inner wall of the container.

7. The steeping apparatus of claim 6, wherein the tab if the lid is substantially diametrically opposite the secondary filter element.

* * * * *